UNITED STATES PATENT OFFICE.

FRED H. RELYEA, OF NEWARK, NEW JERSEY.

ANTISEPTIC COMPOUND.

1,297,735.      Specification of Letters Patent.      Patented Mar. 18, 1919.

No Drawing.      Application filed December 4, 1917. Serial No. 205,329.

*To all whom it may concern:*

Be it known that I, FRED H. RELYEA, a citizen of the United States, residing at 168 Roseville Ave., Newark, in the county of Essex and State of New Jersey, have invented certain new and useful Improvements in Antiseptic Compounds, of which the following is a specification.

My invention relates to a composition of matter which as it is dissolved gives to the solution of it antiseptic and germicidal properties, and more particularly relates to compounds capable of liberating oxygen upon contact with water.

It has long been known that peroxids such as hydrogen peroxid, sodium peroxid, magnesium peroxid, and the perborates yield nascent oxygen when brought in contact with water, and the nascent oxygen so produced gives to the solution antiseptic and germicidal properties. However, it is well known that peroxid of hydrogen when used in contact with human tissues possesses irritating properties and if used repeatedly bring about such destruction of the tissues in wounds as to prevent prompt healing and repair of the tissues.

It is likewise well known that sodium peroxid and, in fact, the peroxids of alkaline earth metals when dissolved in water make such strong alkaline solutions as to likewise injuriously affect tissues as well as prevent tissue repair in wounds, ulcers, etc.

It is likewise a matter of common knowledge that sodium perborate, while stable in powder form, does not readily yield nascent oxygen in sufficient quantities and with the required promptness for effective use for antiseptic and germicidal purposes when dissolved in water. It also has the disadvantage of possessing a higher degree of alkilinity than is desirable for an antiseptic and germicidal agent to possess when intended for application to wounds, ulcers, etc., in that the alkalinity tends to prevent the rapid repair of the wounds or ulcerated tissues.

Some of the particular objects in my invention are the production of a compound which upon solution will have prompt germicidal and antiseptic properties and which can be freely used upon open wounds and ulcers without the prevention of the prompt repair and new formation of new tissue, and which will be free from local and other irritating effects upon mucous or serous surfaces, and which composition will likewise remain in a permanent and stable condition until brought in contact with moisture.

Among the oxygen yielding compounds which may be used without departing from the spirit of my invention, I have found sodium perborate to give satisfactory results when combined with acid sodium carbonate, which acts as an activating agent, and secures a decomposition of the perborate with the required rapidity. I have found that to mix these two materials into powder form is effective in providing an antiseptic and germicidal solution upon dissolving them in water, by reason of the prompt liberation of the nascent oxygen with the reduction of the objectionable alkalinity possessed by the perborate. As is well known, acid sodium carbonate, which is also called sodium bicarbonate is almost neutral as its aqueous solution is very faintly alkaline, showing that the salt remains substantially unhydrolyzed.

I have likewise found that the liberation of nascent oxygen brought about by the solution of the sodium perborate with the acid sodium carbonate is still further improved by the further addition of a phosphate, preferably the disodium phosphate, whose aqueous solution is very weakly alkaline, showing that it remains substantially unhydrolyzed.

For the preparation of a satisfactory compound which will possess the desired permanence and stability and freedom from irritative and caustic effects upon wounds and ulcerated tissues or inflamed or normal mucous or serous surfaces, I have found the following combination and proportions to yield satisfactory antiseptic and germicidal results.

Sodium perborate, 50 parts; acid sodium carbonate, 40 parts; and disodium phosphate, 10 parts. These three ingredients are all mixed together in dry powder form, and will remain in a perfectly unaltered condition until the compound is used.

For the preparation of a simple form of antiseptic solution the above compound is dissolved in water in appropriate proportion to suit the particular case or type of inflamed or ulcerated tissues. It is obvious that other solutions of this compound can be made without departing from the spirit of my invention; thus, the compound may be used as a dusting powder upon moist surfaces whereby the compound is dissolved by the secretions or other body or animal fluids present and in this way exert its antiseptic and germicidal properties.

It will be apparent that without departing from the spirit of this invention the compound or composition of matter could be prepared in the form of tablets or compressed tablets, or in other suitable condensed form.

It is also apparent that other elements may be mixed with this composition in the form of filler or other means of solid dilution of the compound without departing from the spirit of the invention.

I have found that one part of the compound in twenty-five or fifty parts of water will make a solution satisfactory as an antiseptic and germicide having substantially no tendency to the prevention of growth of new repair tissue in wounds, ulcers, etc., and to be free from irritative effects upon inflamed or other mucous or serous surfaces.

I have also found that the dilution can be carried to approximately one in one hundred and fifty parts of water with a continuation of satisfactory antiseptic and germicidal properties in the same.

It will be apparent that the proportions of dry materials above mentioned may be departed from without altering the spirit of this invention, and it will also be apparent that other compounds can be substituted for the compounds above mentioned and mentioned in the claims, where same have an equivalent action.

The theory of the operation of the composition herein disclosed is believed to be as follows:—

Sodium perborate is strongly alkaline in an aqueous solution which shows that the sodium perborate is strongly hydrolyzed. Sodium acid carbonate has a weakly alkaline reaction when dissolved in water, and the same is true of sodium acid phosphate. The solution of the composition before mentioned is feebly alkaline, the alkalinity being less than that of the sodium perborate alone.

Thus the presence of the acid sodium salts, because of the presence of additional sodium ions, reduces the hydrolysis of the sodium perborate solution, and lessens the formation of the objectionable caustic soda which is produced by this.

It is desirable not to have the solution too alkaline or else the production of the oxygen is too slow, and the growth of new cells is prevented. On the other hand it is not desirable to reduce the alkalinity too much or else the generation of the oxygen is so rapid that it forms in large bubbles, which escape very rapidly and do not properly act upon the wound.

Tests have shown that the mixture or composition before mentioned has the correct alkalinity in that minute bubbles are formed which only rise slowly, and hence act upon the wound while growth of tissue is not prevented.

What I claim is:—

1. A composition of matter for treating wounds and the like, comprising a perborate in combination with an acid sodium salt in such proportion that the solution in water is feebly alkaline, the alkalinity of the said solution being less than the solution of the sodium perborate alone, a reduction of the perborate in the said solution taking place with the ultimate liberation of oxygen in minute bubbles, the alkalinity of the said sodium perborate being so reduced that the growth of tissue is not prevented.

2. A stable and non-irritant antiseptic and germicide consisting of the combination of 50 parts of sodium perborate, and an activating agent composed of 40 parts of acid sodium carbonate and 10 parts of sodium phosphate.

3. A non-irritant antiseptic and germicide containing from 25 to 150 parts of water, and one part of a mixture composed of fifty per cent. of sodium perborate and an activating agent comprising forty per cent. of acid sodium carbonate and ten per cent. of disodium phosphate.

In testimony whereof I hereunto affix my signature.

FRED H. RELYEA.